(12) United States Patent
Fields et al.

(10) Patent No.: US 7,613,613 B2
(45) Date of Patent: Nov. 3, 2009

(54) METHOD AND SYSTEM FOR CONVERTING TEXT TO LIP-SYNCHRONIZED SPEECH IN REAL TIME

(75) Inventors: Timothy V. Fields, Austin, TX (US); Brandon Cotton, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 11/009,966

(22) Filed: Dec. 10, 2004

(65) Prior Publication Data
US 2006/0129400 A1    Jun. 15, 2006

(51) Int. Cl.
G10L 21/00 (2006.01)
G10L 21/06 (2006.01)
G10L 13/08 (2006.01)

(52) U.S. Cl. .................. 704/272; 704/260; 704/270; 704/271

(58) Field of Classification Search ................. 704/258, 704/260, 270, 272, 271; 385/473
See application file for complete search history.

(56) References Cited

U.S. PATENT DOCUMENTS

| | | | | |
|---|---|---|---|---|
| 5,884,267 A * | 3/1999 | Goldenthal et al. | ...... | 704/270.1 |
| 5,913,193 A * | 6/1999 | Huang et al. | ................ | 704/258 |
| 5,938,447 A * | 8/1999 | Kirksey | ...................... | 434/169 |
| 6,112,177 A * | 8/2000 | Cosatto et al. | ............... | 704/260 |
| 6,792,406 B1 * | 9/2004 | Fujimura et al. | ............ | 704/257 |
| 6,925,438 B2 * | 8/2005 | Mohamed et al. | ........... | 704/276 |
| 6,990,452 B1 * | 1/2006 | Ostermann et al. | .......... | 704/260 |
| 7,130,790 B1 * | 10/2006 | Flanagan et al. | ................ | 704/2 |
| 7,149,690 B2 * | 12/2006 | August et al. | ................ | 704/270 |
| 7,168,953 B1 * | 1/2007 | Poggio et al. | ................ | 434/185 |
| 7,203,648 B1 * | 4/2007 | Ostermann et al. | .......... | 704/260 |
| 7,260,539 B2 * | 8/2007 | Cosatto et al. | ............... | 704/275 |
| 2001/0049596 A1 * | 12/2001 | Lavine et al. | ................... | 704/9 |
| 2002/0069059 A1 * | 6/2002 | Smith | ......................... | 704/257 |
| 2002/0161582 A1 * | 10/2002 | Basson et al. | ................ | 704/260 |
| 2003/0028380 A1 * | 2/2003 | Freeland et al. | ............. | 704/260 |
| 2003/0069732 A1 * | 4/2003 | Stephany et al. | ............ | 704/270 |
| 2003/0163314 A1 * | 8/2003 | Junqua | ........................ | 704/260 |
| 2003/0163315 A1 * | 8/2003 | Challapali et al. | ........... | 704/260 |
| 2004/0019484 A1 * | 1/2004 | Kobayashi et al. | .......... | 704/258 |
| 2004/0107101 A1 * | 6/2004 | Eide | ............................ | 704/260 |
| 2004/0215460 A1 * | 10/2004 | Cosatto et al. | ............... | 704/260 |

(Continued)

OTHER PUBLICATIONS

Cosatto, E.; Graf, H.P., "Photo-realistic talking-heads from image samples," Multimedia, IEEE Transactions on , vol. 2, No. 3, pp. 152-163, Sep. 2000.*

(Continued)

Primary Examiner—Richemond Dorvil
Assistant Examiner—Douglas C Godbold
(74) Attorney, Agent, or Firm—Perkins Coie LLP

(57) ABSTRACT

A method and system for presenting lip-synchronized speech corresponding to the text received in real time is provided. A lip synchronization system provides an image of a character that is to be portrayed as speaking text received in real time. The lip synchronization system receives a sequence of text corresponding to the speech of the character. It may modify the received text in various ways before synchronizing the lips. It may generate phonemes for the modified text that are adapted to certain idioms. The lip synchronization system then generates the lip-synchronized images based on the phonemes generated from the modified texts and based on the identified expressions.

24 Claims, 4 Drawing Sheets

U.S. PATENT DOCUMENTS

2005/0096909 A1* 5/2005 Bakis et al. .................. 704/260
2005/0107127 A1* 5/2005 Moriya ....................... 455/566
2006/0074689 A1* 4/2006 Cosatto et al. .............. 704/275

OTHER PUBLICATIONS

"Headcase Technology," RED TED—3D Talking Heads for your website and windows applications, Available at http://www.redted.mcmail.com/headcase.htm [last accessed Nov. 2, 2004] 4 pages.

"Real-Time, 3D, Natural Speech Facial Animation," Fluent Animated Speech, www.sensoryinc.com [last accessed Nov. 2, 2004] 2 pages.

Comet, Michael B., "Lip Sync—Making Characters Speak," Copyright 1998 Michael D. Comet, Available at http://www.comet-cartoons.com/toons/3ddocs/lipsync/lipsync.html, [last accessed Nov. 2, 2004] 12 pages.

Decarlo, Doug and Matthew Stone, "Rutgers University Talking Head," Available at http://www.cs.rutgers.edu/~village/ruth/ [last accessed Nov. 2, 2004] 2 pages.

De Leeuw, Ben, "Lips Let Loose, Straight Talking with LIPSinc. Ventriloquist 1.0," *News and Opinions*, 3D Direct Newsletter, Mar. 13, 2000, Available at http://www.3dgate.com/news_and_opinions/000313/0313ventriloquist.html [last accessed Nov. 2, 2004] 5 pages.

Lin, I-Chen et al., "A Speech Driven Talking Head System Based on a Single Face Image," *Computer Graphics and Applications*, 1999, *Proceedings of Seventh Pacific Conference*, Publication Date 1999, pp. 43-49.

Lin, I-Chen, "Image-based Talking Head from a single image," *Image Talk: a chinese text-to-speech talking head*, Feb. 27, 1999, Available at http://graphics.csie.ntu.edu.tw/project/ImageTalk/ImageTalk.htm [last accessed Nov. 2, 2004] 3 pages.

Perng, Woei Luen et al., "Image Talk: A Real Time Synthetic Talking Head Using One Single Image with Chinese Text-To-Speech Capability," *Sixth Pacific Conference on Computer Graphics and Applications* (PG'98), 1998, 9 pages.

"Declarative Programming for Natural Language Generation," *SPUD-Matthew Stone's NLG Page*, Available at http://www.cs.rutgers.edu/~mdstone/nlg.html [last accessed Nov. 11, 2004] 4 pages.

Wilson, Jim, "Talking Heads," *New Face of Animation*,. Available at http://popularmechanics.com/science/research/2000/new_face_animation/print.phtml [last accessed Nov. 2, 2004] 3 pages.

\* cited by examiner

METHOD AND SYSTEM FOR CONVERTING TEXT TO LIP-SYNCHRONIZED SPEECH IN REAL TIME

TECHNICAL FIELD

The described technology relates to synchronizing lip movement of a character with speech of the character.

BACKGROUND

Many types of lip synchronization software are currently available. One type of lip synchronization software inputs an image of a person and a sequence of phonemes and outputs a sequence of images of the person with their lip movement synchronized to the phonemes. When the audio of the phonemes (e.g., via an enunciator) is output simultaneously with the sequence of images, the character appears to be speaking the audio and is sometimes referred to as a "talking head." Another type of lip synchronization software additionally inputs expressions and adjusts the image of the character to reflect those expressions. For example, the expressions may be used to reflect sadness, happiness, worry, surprise, fright, and so on. Lip synchronization software may use morphing techniques to transition between phonemes and between the different expressions. For example, a change in expression from sad to happy may occur over a two-second interval, rather than from one update of the image to the next.

Lip synchronization software has been used in many applications including game and Internet communications. Game applications may provide images of characters of the game along with the voice of the characters. The voice of a character may be augmented with lip movement instructions that indicate how the lips are to move to correspond to the voice. When a character of the game is to speak, the game provides the lip synchronization software with the lip movement instructions (which may be represented by phonemes) along with an image of the character. The lip synchronization software then controls the display of the character with lips synchronized to the voice. Internet communication applications have used lip synchronization software to display a talking head representing a person who is currently speaking remotely. As a person speaks, corresponding lip movement instructions may be transmitted along with the voice to the computer systems of listeners. The lip movement instructions can be created in various ways. The lip movement instructions can be derived from analysis of the person's actual lip movement or can be a sequence of phonemes derived from the voice. A listener's computer system can display an image of the person (or caricature of the person) with the lips synchronized to the voice based on the lip movement instructions. The sending of lip movement instructions requires significantly less bandwidth than the sending of a video of the person. Thus, lip synchronization software can be used in situations where sending of video is not practical.

Typical applications that use lip synchronization software identify lip movement instructions either automatically as a person speaks or manually as specified by a developer of the application. Some applications may automatically generate lip movement instructions and then allow for manual modification of the instructions to achieve a desired effect.

It would be desirable to have a system that would automatically generate a talking head based on text, rather than voice, that is received in real time. There are many environments in which text is generated in real time, such as closed-captioned text of television broadcasts, text entered via a keyboard during an Internet chat or instant messaging session, text generated by a stenographer, and so on.

SUMMARY

A method and system for presenting lip-synchronized speech corresponding to the text received in real time is provided. A lip synchronization system provides an image of a character that is to be portrayed as speaking text received in real time. The lip synchronization system receives a sequence of text corresponding to the speech of the character. It may modify the received text in various ways before synchronizing the lips. It may generate phonemes for the modified text that are adapted to certain idioms. The lip synchronization system then generates the lip-synchronized images based on the phonemes generated from the modified texts and based on the identified expressions.

DETAILED DESCRIPTION

A method and system for presenting lip-synchronized speech corresponding to the text received in real time is provided. A lip synchronization system provides an image of a character that is to be portrayed as speaking text received in real time. The character may be an actual or animated person, animal, or any other thing that can appear to speak. The lip synchronization system receives a sequence of text corresponding to the speech of the character. For example, the received text may be the text sent as the closed captions of a television broadcast, entered by a participant in a real-time communications, and so on. The lip synchronization system may modify the received text in various ways before synchronizing the lips. For example, if the text is closed-captioned text, then the lip synchronization system may add, remove, or replace words. The lip synchronization system may replace certain acronyms with their corresponding words, such as the acronym "BRB" used in a chat session with "I'll be right back." The lip synchronization system may replace words with more or less complex equivalents to dumb up or dumb down the speech. The lip synchronization system may add text to affect various idioms. For example, the lip synchronization system may add an "ummm," an "eh," or slang words to the text to produce certain effects, such as making the speaker appear confused or stumbling over words. The lip synchronization system may generate phonemes for the modified text that are adapted to certain idioms. For example, the lip synchronization system may select phonemes to affect a certain accent. The lip synchronization system may also identify expressions from the received text. For example, the lips synchronization system may detect the words "[laughter]" or "[crying]" in closed-captioned text and identify the expressions of laughing or crying. The lip synchronization system then generates the lip-synchronized images based on the phonemes generated from the modified texts and based on the identified expressions. In this way, when the system outputs the images and audio of the modified text, the character's lips are synchronized with the audio.

Figure 1:
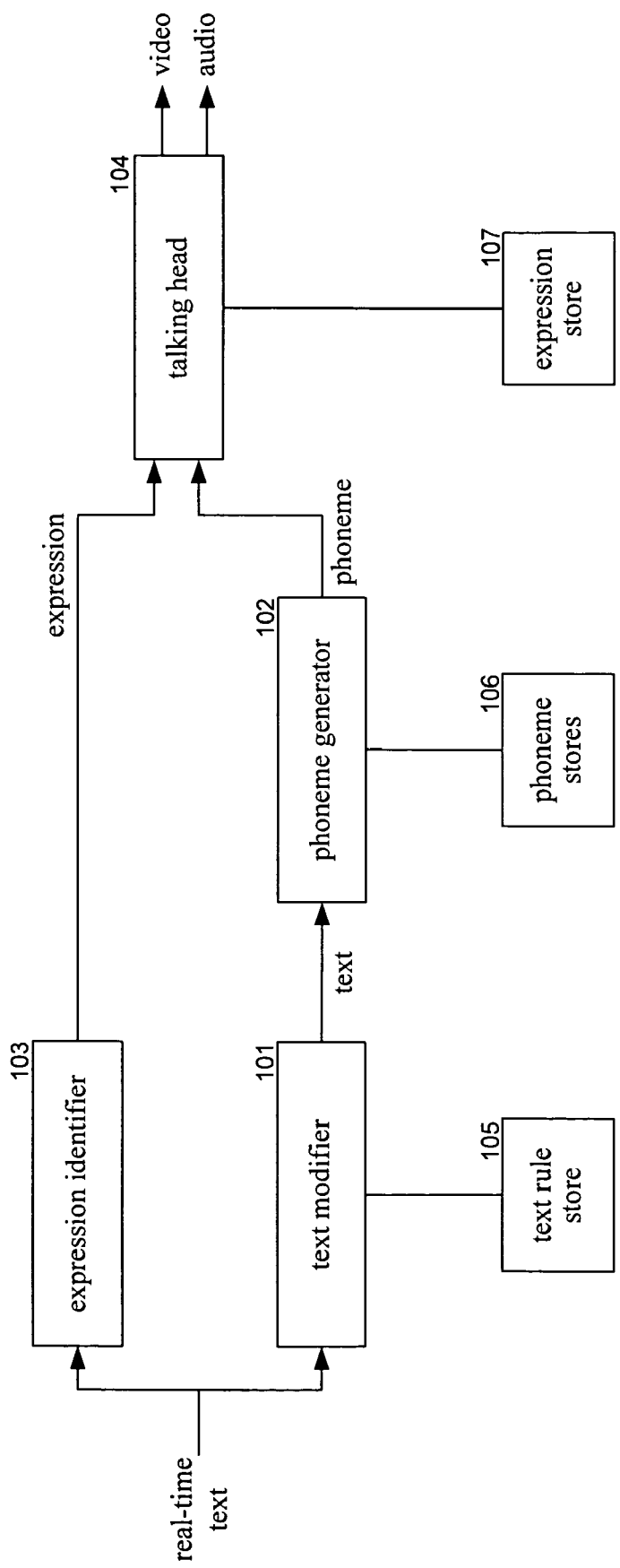
FIG. 1 is a block diagram that illustrates components of the lip synchronization system in one embodiment.

FIG. 1 is a block diagram that illustrates components of the lip synchronization system in one embodiment. The lip synchronization system includes a text modifier component 101, a phoneme generator component 102, an expression identifier component 103, and a talking head component 104. The text modifier component inputs text as it is received in real time and modifies the text according to rules stored in a text rule store 105. The rules may specify how to add, remove, and replace words within the text. The text modifier component provides the modified text to the phoneme generator component. The phoneme generator component converts the modified text into a sequence of phonemes based on the mapping of words to phonemes stored in a phoneme store 106. The phoneme store may contain phonemes that reflect various idioms, such as accent. The phoneme generator component then provides the sequence of phonemes to the talking head component. The expression identifier component receives the text in real time and identifies expressions for the character from the text. The expression identifier component may be customized to identify expressions in a way that is unique to the character. For example, if an expression of sadness would normally be identified, the expression identifier component may identify happiness instead to portray the character's disregard of a sad situation. The expression identifier component then provides the expressions to the talking head component. The expressions and phonemes may be mapped to the underlying text so that the talking head component can synchronize the expressions and the phonemes. The talking head component, which may be a conventional component, displays an image of the character corresponding to the current expression that is retrieved from an expression store 107. The talking head component modifies the lips of the character based on the sequence of phonemes so that the lips are synchronized with the phonemes. The talking head component then outputs the sequence of images of the character and enunciates the sequence of phonemes to affect a talking head that is speaking in real time the text that is received in real time.

The computing device on which the lip synchronization system is implemented may include a central processing unit, memory, input devices (e.g., keyboard and pointing devices), output devices (e.g., display devices), and storage devices (e.g., disk drives). The memory and storage devices are computer-readable media that may contain instructions that implement the lip synchronization system. In addition, data structures and message structures may be stored or transmitted via a data transmission medium, such as a signal on a communications link. Various communications links may be used, such as the Internet, a local area network, a wide area network, or a point-to-point dial-up connection.

The lip synchronization system may be implemented in various operating environments including personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The lip synchronization system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
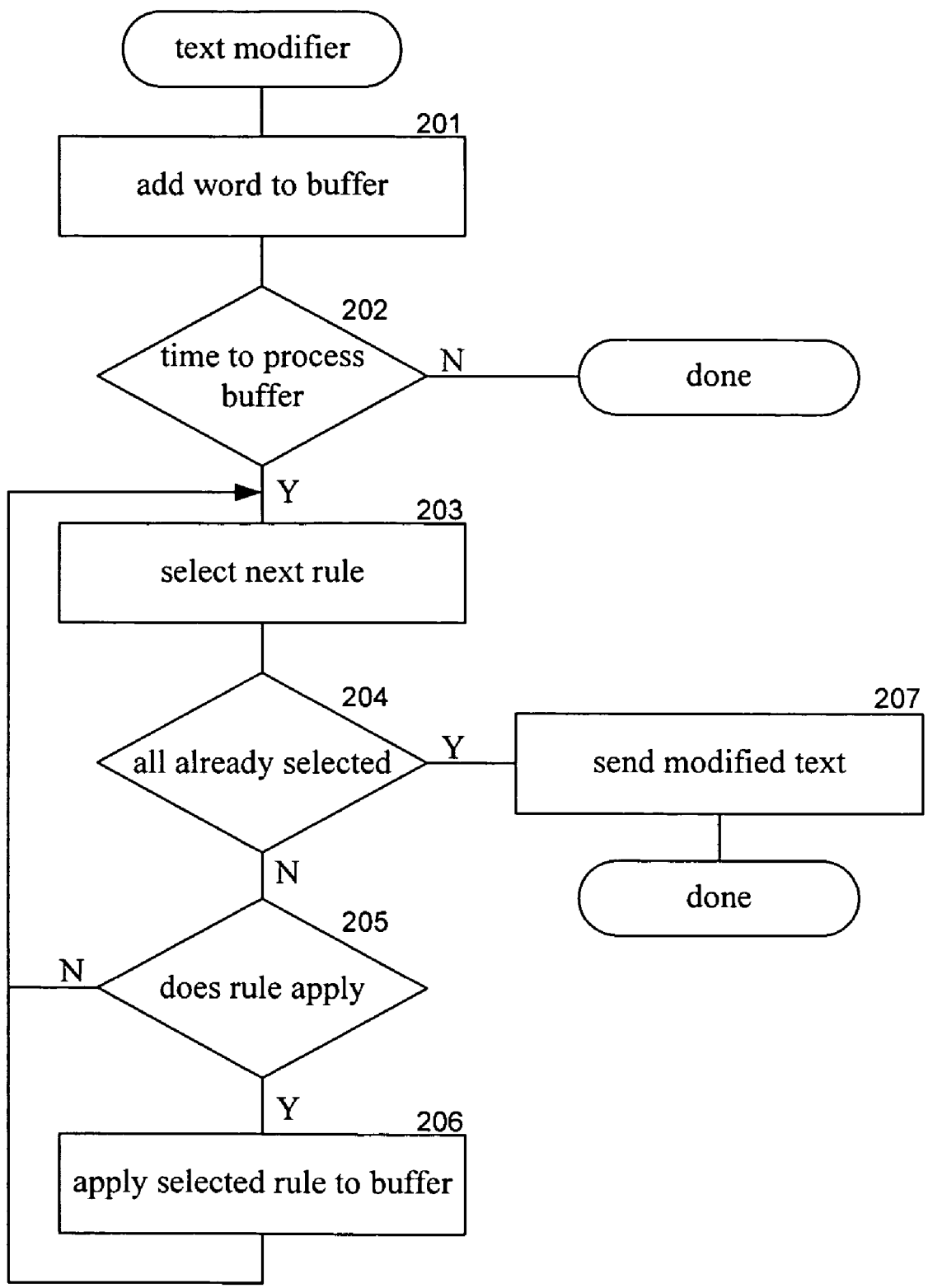
FIG. 2 is a flow diagram that illustrates the processing of the text modifier component of the lip synchronization system in one embodiment.

FIG. 2 is a flow diagram that illustrates the processing of the text modifier component of the lip synchronization system in one embodiment. The component may be passed the next word of the text that is received in real time. The component buffers the words, applies the modify rules to the buffer full of words, and then provides the modified text of the buffer to the phoneme generator component. Example rules may include removing certain verbs from sentences, adding "umm" after each phrase, and so on. In block 201, the component adds the passed words to the buffer. In decision block 202, if the rules can be applied to the buffer of words, then the component continues at block 203, else the component completes. The rules can be applied to the buffer of words, for example, if a certain number of words are buffered, a sentence is buffered, a paragraph is buffered, and so on. In blocks 203-206, the component loops applying rules to the words in the buffer. In block 203, the component selects the next rule. In decision block 204, if all the rules have already been selected, then the component continues at block 207, else the component continues at block 205. In decision block 205, if the selected rule applies to the buffer, then the component continues at block 206, else the component loops to block 203 to select the next rule. In block 206, the component applies the selected rule to the words in the buffer and then loops to block 203 to select the next rule. In block 207, the component sends the modified text of the buffer to the phoneme generator component and then completes.

Figure 3:
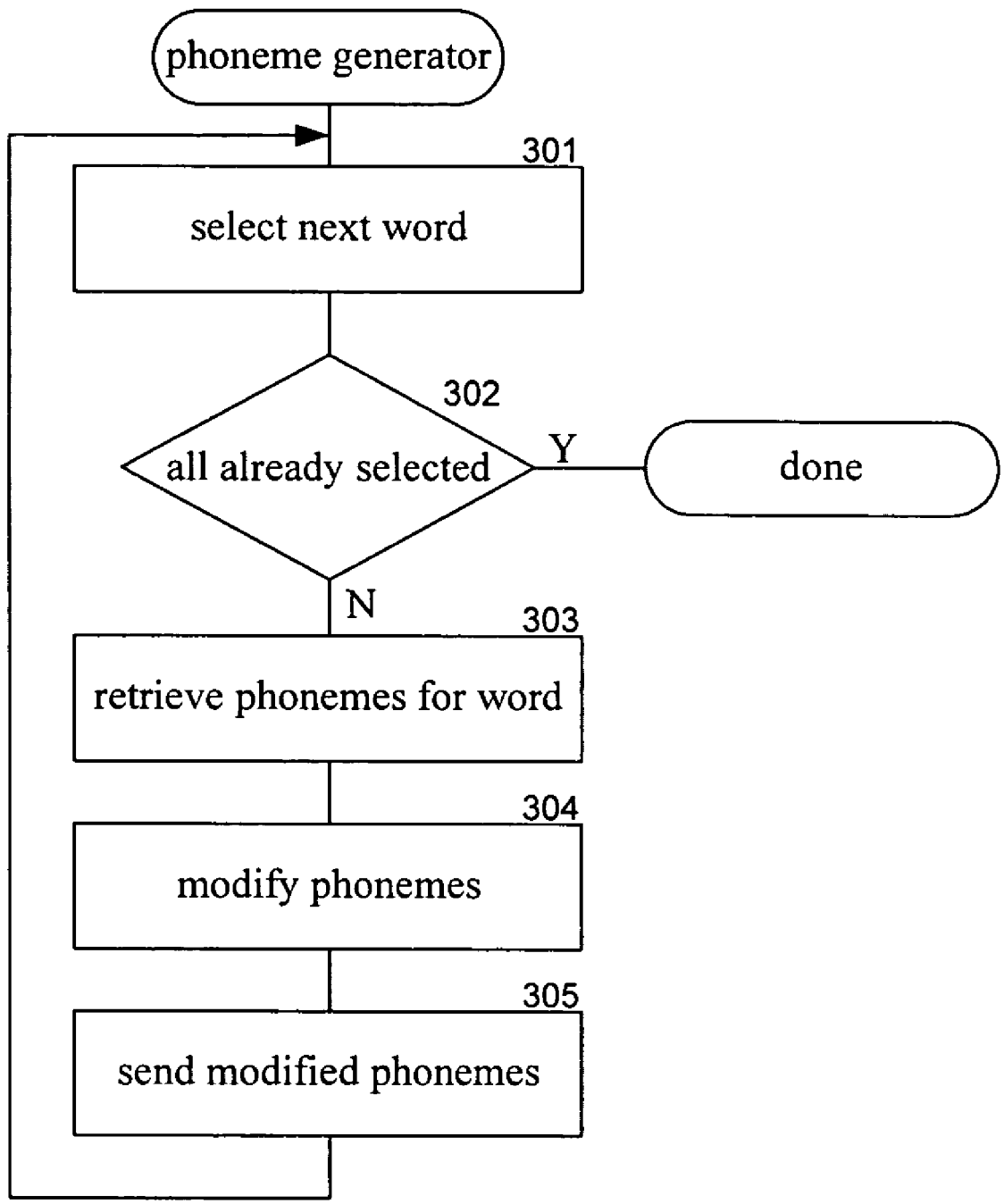
FIG. 3 is a flow diagram that illustrates the processing of the phoneme generator component of the lip synchronization system in one embodiment.

FIG. 3 is a flow diagram that illustrates the processing of the phoneme generator component of the lip synchronization system in one embodiment. The component may be passed a buffer of modified text and generates the phonemes for that text. In block 301, the component selects the next word of the passed buffer. In decision block 302, if all the words have already been selected, then the component completes, else the component continues at block 303. In block 303, the component retrieves the phonemes for the selected word (or a selected phrase). The component may retrieve the phonemes from the phoneme store. The phoneme store may contain phonemes that are appropriate for the particular idiom of the character. For example, different sets of phonemes may be used to affect accents of the characters from different countries, such as Australia, Canada, the United Kingdom, and the United States. The phoneme store may also contain phonemes that are particular to a certain character. In block 304, the component may modify the phonemes to produce certain effects. For example, the component may replace certain phonemes with other phonemes to achieve regional effects. In block 305, the component sends the phonemes to the talking head component and then loops to block 301 to select the next word of the buffer.

Figure 4:
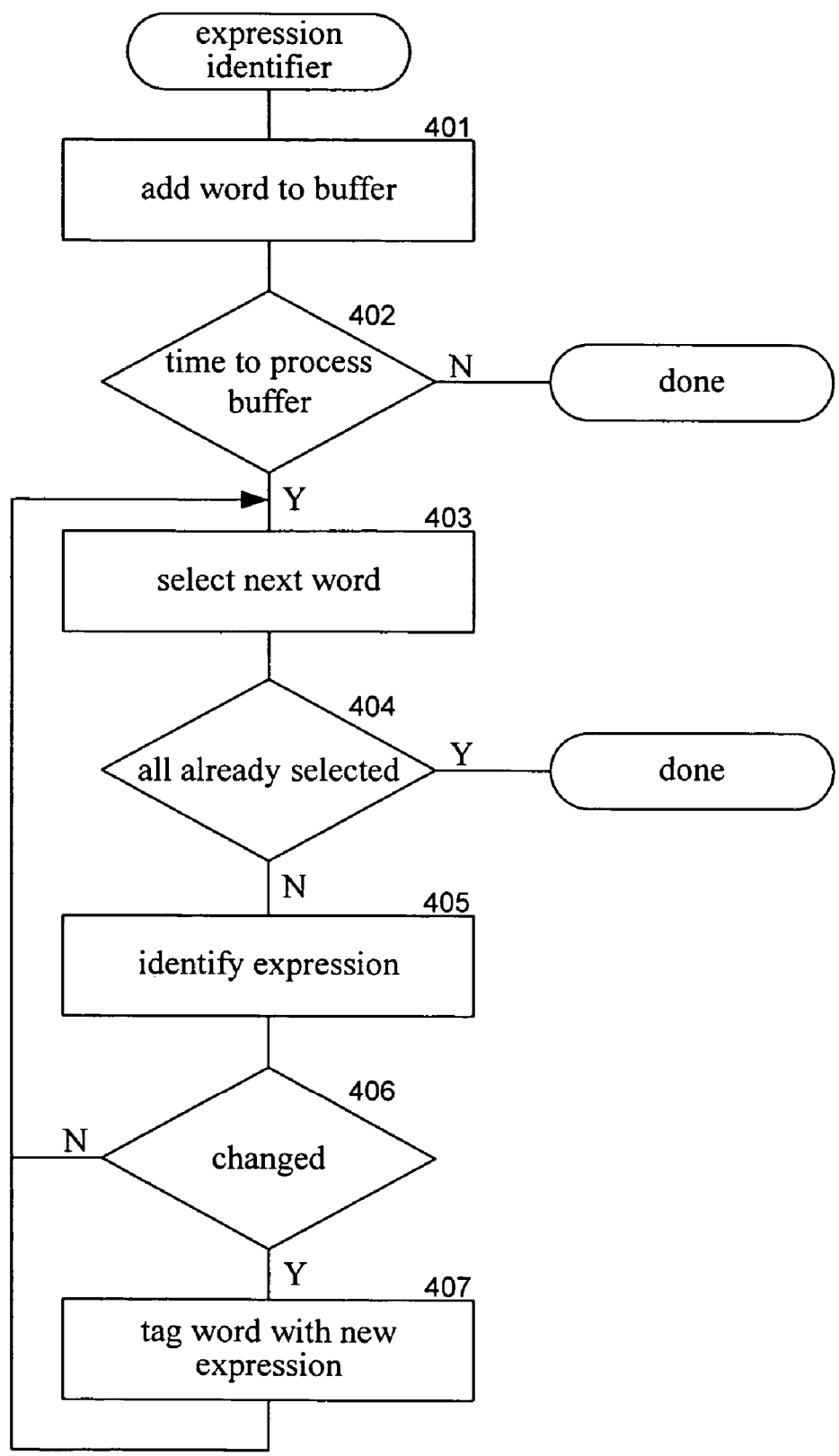
FIG. 4 is a flow diagram that illustrates the processing of the expression identifier component of the lip synchronization system in one embodiment.

FIG. 4 is a flow diagram that illustrates the processing of the expression identifier component of the lip synchronization system in one embodiment. The component is passed a word of the text that is received in real time and identifies changes in expressions indicated by the text. For example, the component may identify that text received rapidly indicates that the speaker is excited or that text received slowly indicates the speaker is contemplative. In block 401, the component adds the passed word to the buffer. In decision block 402, if it is time to process the words of the buffer, then the component continues at block 403, else the component completes. In blocks 403-407, the component loops selecting each word and identifying whether the current expression has changed. In block 403, the component selects the next word of the buffer. In decision block 404, if all the words of the buffer have already been selected, then the component completes, else the component continues at block 405. In block 405, the component identifies an expression based on the selected word. For example, the component may compare previous words and following words within the buffer to determine the current expression. In decision block 406, if the current expression has changed from the previous expression, then the component continues at block 407, else the component loops to block 403 to select the next word of the buffer. In block 407, the component tags the selected word with the new expression and then loops to block 403 to select next word. Upon completion, the component provides the buffer with the tagged words to the talking head component.

One skilled in the art will appreciate that although specific embodiments of the lip synchronization system have been described herein for purposes of illustration, various modifications may be made without deviating from the spirit and scope of the invention. For example, the lip synchronization system may be augmented to move the character's hands to effect the output of the modified text in a sign language, such as American Sign Language. Accordingly, the invention is not limited except by the appended claims.

We claim:

1. A method for presenting information in real time, the method comprising:
   providing a plurality of rules for controlling modification of words of a sequence of words, the rules including rules to add a sound after a phrase, to replace words with words of different complexity, to remove certain verbs without replacing the verbs, and to modify words based on identification of a current expression derived from comparison of words of the sequence to be spoken;
   providing an expression store with images of a character representing different expressions of emotion for that character;
   receiving a sequence of words;
   modifying the words of the received sequence by for each of a plurality of rules,
      determining whether the rule applies to words of the received sequence; and
      when it is determined that the rule applies, modifying the words of the received sequence in accordance with the rule;
   generating speech for the character corresponding to the modified words, the speech represented by a sequence of phonemes including replacing phonemes with other phonemes to achieve regional effects;
   identifying expressions of emotion from the words of the received sequence;
   mapping the phonemes of the speech and the identified expressions for the character to the words of the received sequence;
   generating a sequence of images based on the images of the expression store to represent the character speaking the generated speech and having the identified expressions of emotion and to represent hands of the character moved to effect output of the modified words in a sign language, wherein the mapping to words of the received sequence is used to synchronize the movement of the lips representing the character enunciating the phonemes of the words with the image of the character exhibiting the identified expressions of emotion mapped to those words so that the speaking of a word is synchronized with the image of the character exhibiting the expression of emotion identified from that word; and
   outputting the generated speech represented by the sequence of phonemes and the sequence of generated images to portray the character speaking the words of the modified received sequence and having the identified expressions.

2. The method of claim 1 wherein the sequence of words is closed-captioned text of a television broadcast.

3. The method of claim 1 wherein the sequence of words is entered via a keyboard by a participant in a computer-based chat session.

4. The method of claim 1 wherein a rule specifies to modify the words of the sequence by expanding acronyms.

5. The method of claim 1 wherein a rule specifies to modify the words of the sequence to reflect an idiom.

6. The method of claim 5 wherein the idiom is associated with the character.

7. The method of claim 1 wherein the generating of speech includes identifying phonemes from the modified words.

8. The method of claim 7 wherein the phonemes are identified to reflect an idiom.

9. A system for presenting a lip-syncing character, comprising:
   a rules store containing rules for controlling modification of words of sequence of words, the rules including rules to add a sound after a phrase and to remove certain verbs;
   an expression store containing images of a character representing different expressions of emotion for that character;
   a modify word component that receives a sequence of words in real time and modifies the words of the sequence in accordance with the rules of the rules store;
   an identify expressions component that identifies expressions of emotion from the words of the sequence and maps the expressions of emotion to the words;
   a lip synchronization component that inputs the modified words of the sequence, the map of expressions of emotion to the words, and the images of the character representing different expressions of emotion and outputs in real time as the words are received speech corresponding to the modified words of the sequence and images of the character speaking the output speech and having the identified expressions of emotion synchronized to the speech as indicated by the map and images of hands of the character moving to effect output of the modified words in a sign language.

10. The system of claim 9 wherein the sequence of words is closed-captioned text of a television broadcast.

11. The system of claim 9 wherein the sequence of words is entered via a keyboard by a participant in a computer-based chat session.

12. The system of claim 9 wherein a rule specifies to modify the words of sequence by expanding acronyms.

13. The system of claim 9 wherein a rule specifies to modify the words of the sequence to reflect an idiom.

14. The system of claim 9 wherein the generating of speech includes identifying phonemes from the modified words of the sequence.

15. The system of claim 14 wherein the phonemes are identified to reflect an idiom.

16. A computer-readable storage medium containing instructions for controlling a computer to present images of a character speaking, by a method comprising:
   providing a plurality of rules for controlling modification of words of a sequence of words, the rules including rules to add a sound after a phrase and to replace words with words of different complexity;

providing images of a character representing different expressions of emotion of the character;

receiving a sequence of words in real time;

modifying the words of the sequence in accordance with the provided rules;

after modifying the words, generating speech corresponding to the received sequence of words as modified;

identifying expressions of emotion from the words of the received sequence of words;

generating a sequence of images based on the provided images to represent the character speaking the generated speech and exhibiting the identified expressions of emotion so that the speaking of a word is synchronized with an expression of emotion identified from that word and to represent the character using a sign language to effect the output of modified words of the sequence; and outputting the generated speech and sequence of images to portray the character speaking the text with the identified expression of emotion.

17. The computer-readable medium of claim 16 wherein the sequence of words is closed-captioned text.

18. The computer-readable medium of claim 16 wherein the sequence of words is entered by a participant in a computer-based chat session.

19. The computer-readable medium of claim 16 wherein a rule specifies to modify the words of the sequence by expanding acronyms.

20. The computer-readable medium of claim 16 wherein a rule specifies to modify the words of the sequence to reflect an idiom.

21. The computer-readable medium of claim 16 wherein the generating of speech includes identifying phonemes from the words of the sequence.

22. The computer-readable medium of claim 21 wherein the phonemes are identified to reflect an idiom.

23. The computer-readable medium of claim 16 wherein different images of the character are provided for different expressions.

24. The computer-readable medium of claim 16 wherein the generating of the sequence of images represents the character lip-syncing the generated speech.

* * * * *

UNITED STATES PATENT AND TRADEMARK OFFICE
CERTIFICATE OF CORRECTION

PATENT NO. : 7,613,613 B2 Page 1 of 1
APPLICATION NO. : 11/009966
DATED : November 3, 2009
INVENTOR(S) : Fields et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 664 days.

Signed and Sealed this

Fourteenth Day of December, 2010

David J. Kappos
*Director of the United States Patent and Trademark Office*